(12) United States Patent
McKinley

(10) Patent No.: US 10,641,413 B2
(45) Date of Patent: May 5, 2020

(54) LOADING DEVICES AND METHODS OF LOADING PIPE FUSION MACHINES

(71) Applicant: Fast Fusion, LLC, Palisade, CO (US)

(72) Inventor: Richard S. McKinley, Palisad, CO (US)

( * ) Notice: Subject to any disclaimer, the term of this patent is extended or adjusted under 35 U.S.C. 154(b) by 10 days.

(21) Appl. No.: 15/285,323

(22) Filed: Oct. 4, 2016

(65) Prior Publication Data

US 2017/0023152 A1    Jan. 26, 2017

Related U.S. Application Data

(62) Division of application No. 13/212,251, filed on Aug. 18, 2011, now Pat. No. 9,458,949.

(51) Int. Cl.

| | |
|---|---|
| *F16L 1/09* | (2006.01) |
| *F16L 1/06* | (2006.01) |
| *B65G 65/02* | (2006.01) |
| *F16L 1/10* | (2006.01) |
| *B29C 65/78* | (2006.01) |

(52) U.S. Cl.
CPC .............. *F16L 1/09* (2013.01); *B65G 65/02* (2013.01); *F16L 1/06* (2013.01); *B29C 65/7841* (2013.01); *F16L 1/10* (2013.01)

(58) Field of Classification Search
CPC ..... F16L 1/09; F16L 1/06; F16L 1/032; F16L 1/036; F16L 1/10; B65G 65/02; B29C 65/7841; B29C 65/7802; B29C 65/749; B29C 65/20
USPC ...................................................... 405/184
See application file for complete search history.

(56) References Cited

U.S. PATENT DOCUMENTS

| | | | |
|---|---|---|---|
| 1,877,974 A | 9/1932 | Robb | |
| 2,378,570 A | 6/1945 | Mitchell | |
| 2,559,703 A * | 7/1951 | Bergman | F16L 1/032 414/745.6 |
| 2,667,978 A * | 2/1954 | Pridy | B21C 37/30 414/433 |
| 2,705,119 A * | 3/1955 | Ingwer | F16L 1/06 193/42 |
| 2,737,140 A | 3/1956 | Totten | |
| 2,959,310 A * | 11/1960 | Meister, Jr. | B66C 19/005 414/459 |
| 3,021,969 A * | 2/1962 | Peake | B60P 3/1075 280/414.1 |
| 3,031,093 A * | 4/1962 | Holsclaw | B60P 3/1075 414/533 |

(Continued)

OTHER PUBLICATIONS

Canadian Office Action pertaining to Application No. 2,837,007, dated Nov. 28, 2016.

(Continued)

*Primary Examiner* — Orlando E Aviles
*Assistant Examiner* — Seahee Yoon
(74) *Attorney, Agent, or Firm* — Dinsmore & Shohl LLP; Monika L. Jaensson, Esq.

(57) ABSTRACT

A loading device for lifting an elongated object having an elongate axis includes a frame having a first fulcrum surface and a second fulcrum surface, a first effector arm that pivots about the first fulcrum surface, a second effector arm that pivots about the second fulcrum surface, and an actuator moving the first effector arm and the second effector arm between a retracted position and a deployed position.

19 Claims, 6 Drawing Sheets

(56) References Cited

U.S. PATENT DOCUMENTS

| | | | | |
|---|---|---|---|---|
| 3,077,277 A | * | 2/1963 | Holzman | B60P 3/1066 414/534 |
| 3,561,615 A | | 2/1971 | Forsberg | |
| 4,176,269 A | | 11/1979 | Merrick | |
| 4,209,279 A | | 6/1980 | Aasen | |
| 4,218,158 A | * | 8/1980 | Tesson | F16L 1/26 405/170 |
| 4,352,708 A | * | 10/1982 | McElroy | B29C 66/1142 156/378 |
| 4,990,209 A | * | 2/1991 | Rakes | B29C 65/02 156/351 |
| 5,337,875 A | * | 8/1994 | Lee | B65G 13/12 193/35 C |
| 5,505,811 A | * | 4/1996 | Welch | B29C 65/20 156/358 |
| 5,522,699 A | * | 6/1996 | Smith | F16L 1/036 405/174 |
| 5,814,182 A | * | 9/1998 | McElroy, II | B29C 65/2084 156/358 |
| 5,843,271 A | * | 12/1998 | Andrew | B29C 65/7802 156/499 |
| 6,012,752 A | | 1/2000 | Douglas | |
| 6,212,747 B1 | * | 4/2001 | Porter | B29C 65/2084 29/281.5 |
| 7,076,852 B2 | | 7/2006 | Penman | |
| 7,357,163 B2 | | 4/2008 | Wager | |
| 7,878,732 B2 | | 2/2011 | Sandovel | |
| 7,926,534 B2 | | 4/2011 | Temple | |
| 8,029,036 B2 | * | 10/2011 | Kline | F16L 1/06 254/93 R |
| 8,118,293 B1 | * | 2/2012 | Barger | B23Q 7/05 144/287 |
| 8,646,731 B2 | * | 2/2014 | Buries | F16L 3/16 144/287 |
| 9,080,693 B2 | * | 7/2015 | Cheney | F16L 1/036 |
| 2005/0117973 A1 | | 6/2005 | Nelson | |
| 2009/0194014 A1 | | 8/2009 | Kloster | |
| 2009/0297317 A1 | * | 12/2009 | Kline | B66C 1/427 414/745.4 |
| 2010/0187740 A1 | * | 7/2010 | Orgeron | B25B 5/061 269/218 |
| 2010/0192346 A1 | | 8/2010 | Simmons | |
| 2012/0230771 A1 | * | 9/2012 | Farley | B23P 19/02 405/184 |
| 2013/0028664 A1 | * | 1/2013 | Cherrington | F16L 1/032 405/184 |

OTHER PUBLICATIONS

Eurasian Patent Organization Office Action pertaining to application No. 201791065, dated Feb. 20, 2019.

Examination Report pertaining to corresponding European Patent Application No. 15195935.0, dated Jun. 25, 2019.

* cited by examiner

LOADING DEVICES AND METHODS OF LOADING PIPE FUSION MACHINES

TECHNICAL FIELD

The present disclosure is generally directed to loading devices for pipe fusion machines.

BACKGROUND

Polyethylene pipe is used commercially for the construction of pipelines for various applications such as natural gas, water, sewer, and other materials. In addition, polyethylene pipe may be used as conduit to protect transmission cables such as high voltage electricity, fiber optic telecommunication, telephone, cable television, and other signal cables.

Polyethylene pipe is typically joined through a process called fusion welding, the most common joint being a butt joint. A butt joint is formed by holding the two sections of pipe rigidly, performing a facing operation to square the ends of the pipes and prepare the pipes for welding, then heating the prepared faces of the pipes on a hot plate to the melting point, removing the heating element, and forcing the two melted faces together. The resulting joint may be cooled before being subjected to any handling forces. The result is a fused joint that is as strong or stronger than the parent material and is very reliable.

U.S. Pat. No. 4,990,209 issued to George Rakes entitled "Self Propelled Fusion Machine" (Rakes) is a machine adapted to perform a fusion welding process on polyethylene pipe as described above. Rakes is incorporated herein by reference for all that it discloses and teaches. The Rakes machine performs a sequence of operations to fusion weld polyethylene pipe in a semi automated fashion, with provisions for easily loading and unloading the pipe as it is welded. Additionally, the Rakes device performs the fusion welding process in an enclosed environment, adding to the consistency and speed to a pipeline construction.

U.S. Pat. No. 7,926,534 issued to William Temple entitled "Pipe Welder for Simultaneously Fusing a Plurality of Polyethylene Pipes" (Temple) is a machine adapted to perform a fusion welding process on adjacent pipes, for example, pipes that run parallel to one another along a ditch. Temple is incorporated herein by reference for all that it discloses and teaches.

Both Rakes and Temple describe machines that travel along the direction of the pipe to perform the fusion welding operation to joint sequential pipes. In order to introduce the pipe to the machines of Rakes and Temple, a user must lift and position the pipe manually or using an additional machine such that the pipe fusion machine may prepare the pipes for the fusion welding operation.

Accordingly, a loading device that lifts and positions the pipe for a fusion welding operation is required.

SUMMARY

In one embodiment, a loading device for lifting an elongated object having an elongate axis includes a frame having a first fulcrum surface and a second fulcrum surface, a first effector arm that pivots about the first fulcrum surface, a second effector arm that pivots about the second fulcrum surface, and an actuator moving the first effector arm and the second effector arm between a retracted position and a deployed position.

In another embodiment, a loading device includes a frame having a first fulcrum surface and a second fulcrum surface, a first effector arm that pivots about the first fulcrum surface, where the first effector arm having a first end effector, and a second effector arm that pivots about the second fulcrum surface, where the second effector arm having a second end effector. The loading device also includes an actuator that moves the first effector arm and the second effector arm between a retracted position and a deployed position, where the first end effector and the second end effector each include a lifting surface inclined to a ground surface.

In yet another embodiment, a method of loading an elongated object having an elongate axis into a pipe fusion machine includes positioning a loading device coupled to the pipe fusion machine proximate to the elongated object, where the loading device includes a first effector arm and a second effector arm. The method of loading further includes positioning a first end effector coupled to the first effector arm and a second end effector coupled to the second effector arm along opposites sides of the elongated object, pivoting a first effector arm about a first fulcrum surface of the loading device towards the elongated object and the second effector arm about a second fulcrum surface of the loading device towards the elongated object, and contacting the elongated object with the first end effector and the second end effector to apply a lifting force to the elongated object at a location below the elongate axis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
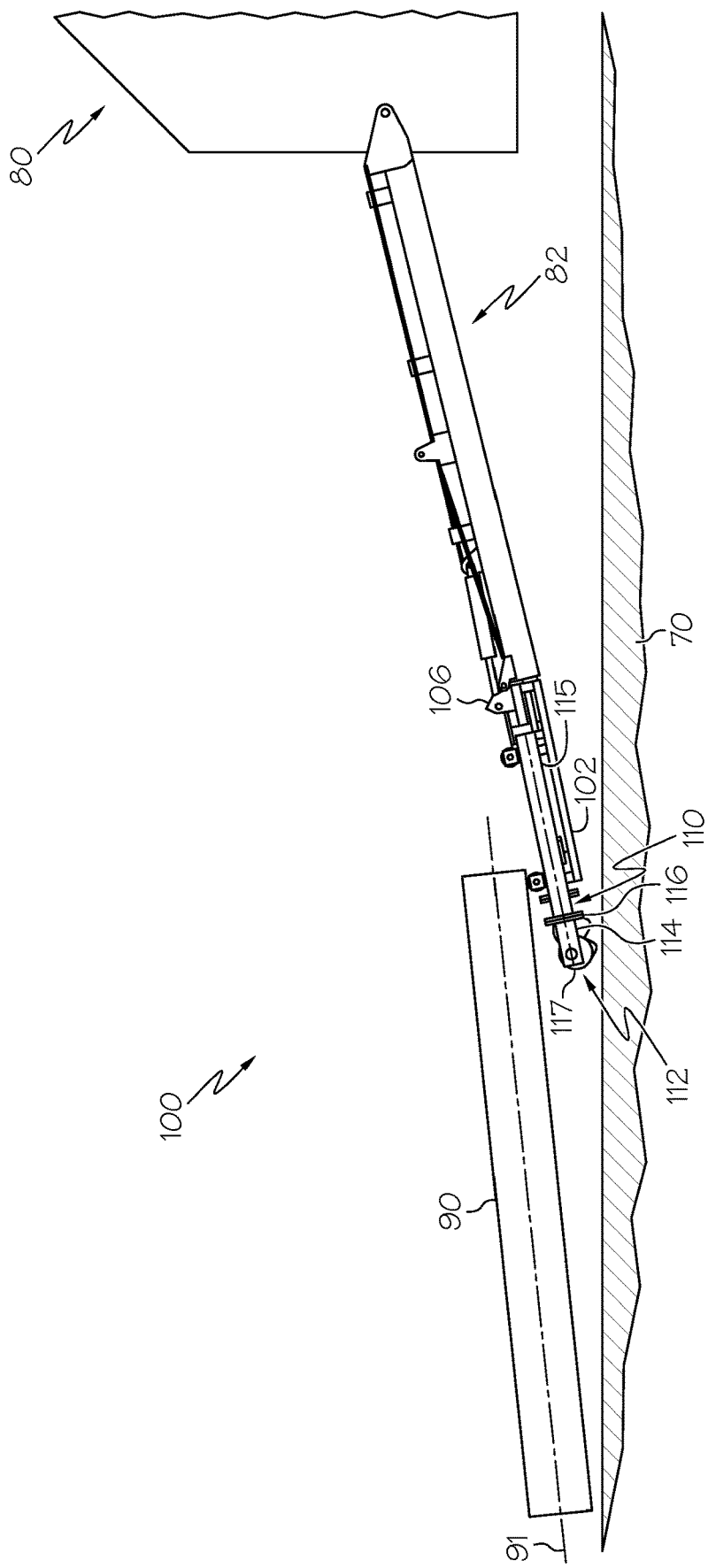
FIG. 1 depicts a side view of a loading device coupled to a pipe welding machine according to one or more embodiments shown and described herein.

Embodiments described herein relate to loading devices that lift elongated objects from a ground surface. The loading devices may be use in a variety of applications including, for example, lifting pipe to introduce the pipe to a pipe fusion machine. Referring to FIG. 1, one embodiment of a loading device for lifting an elongated object for introduction to a pipe fusion machine is depicted. The loading device contacts the elongated object, for example a polyethylene pipe, positioned on a ground surface and applies a lifting force that lifts the elongated object at least partially off of the ground surface. With the elongated object appropriately positioned and lifted off of the ground surface, the pipe fusion machine may translate towards the elongated object, positioning the elongated object for a fusion welding operation.

Figure 2:
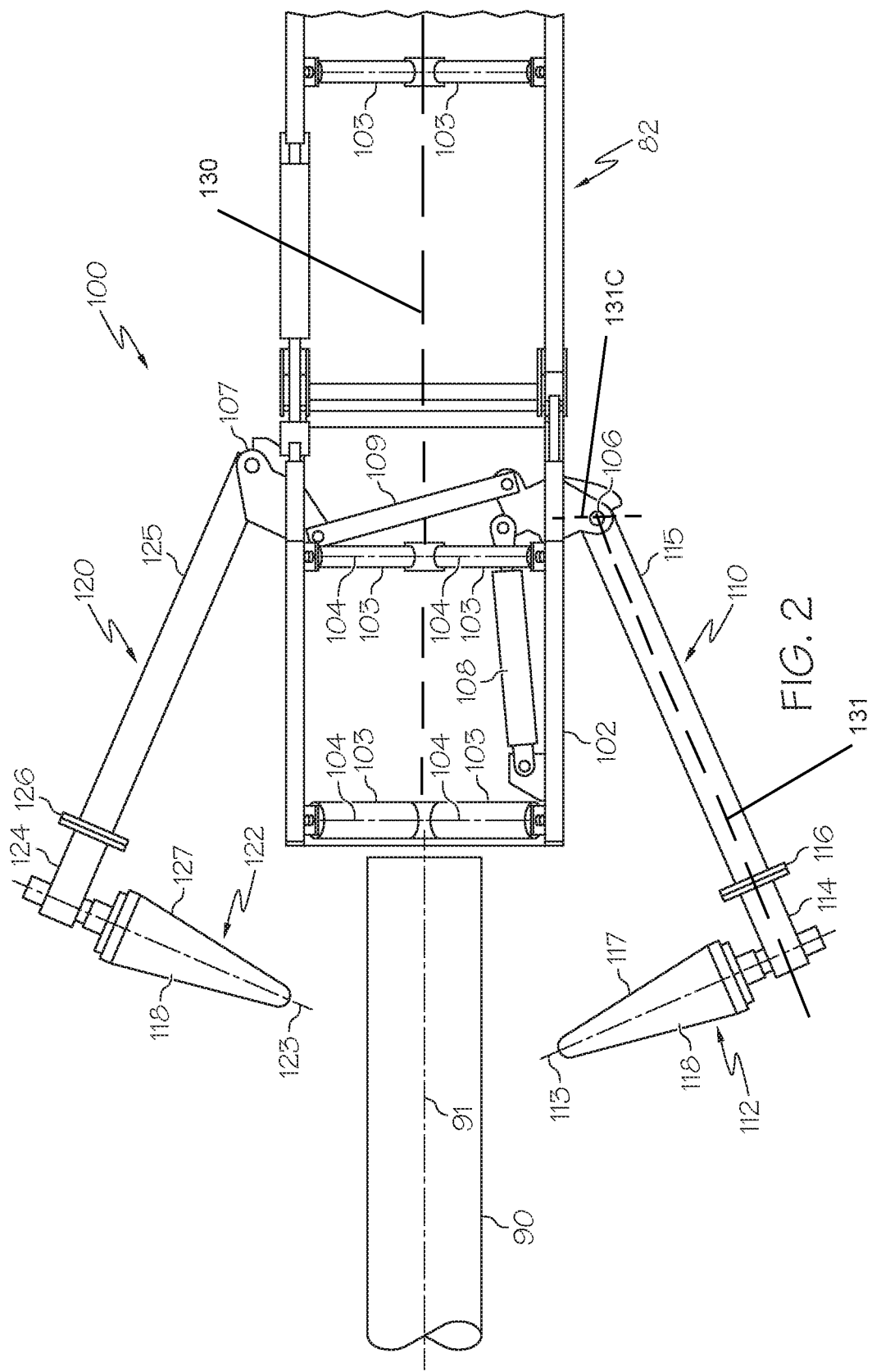
FIG. 2 depicts a top view of a loading device according to one or more embodiments shown and described herein.
Figure 3:
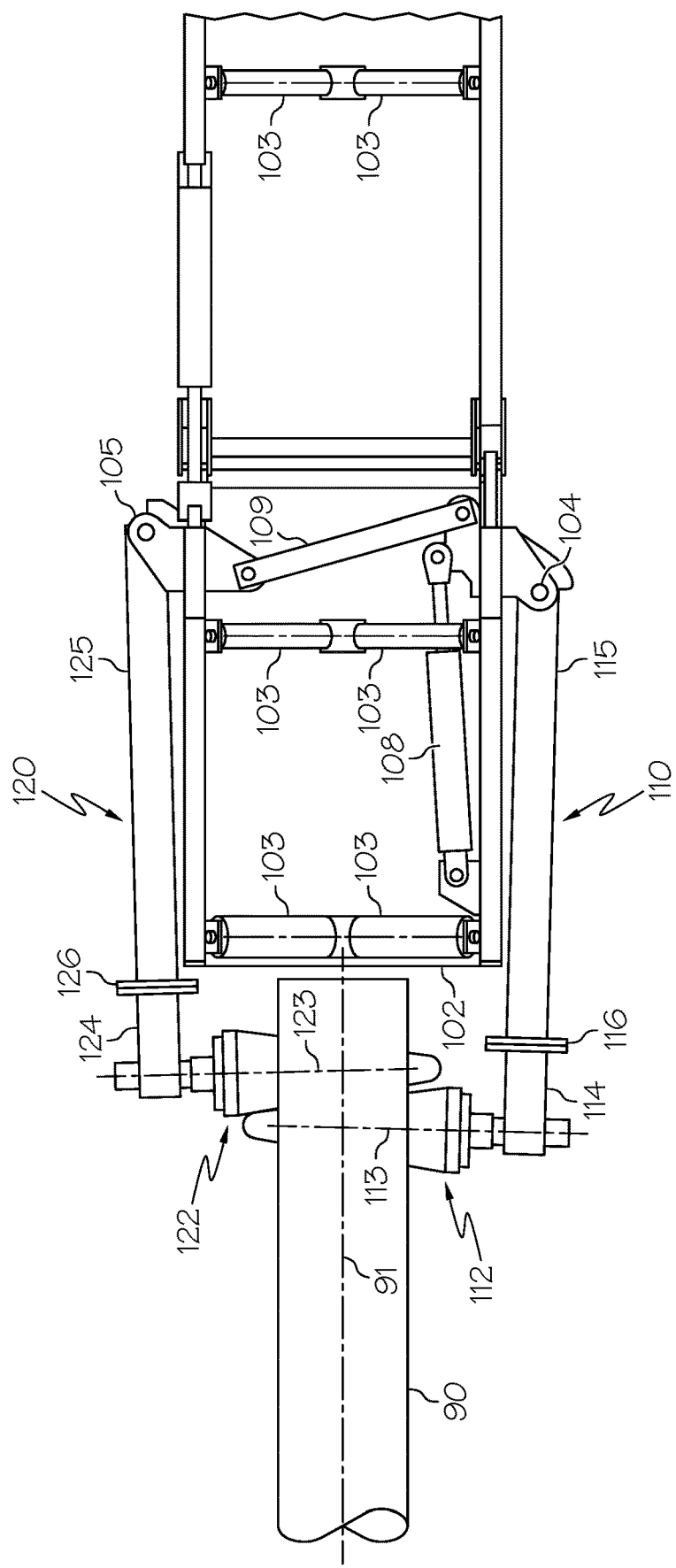
FIG. 3 depicts a top view of a loading device according to one or more embodiments shown and described herein.

Referring now to FIGS. 1-3, one embodiment of a loading device 100 coupled to a pipe fusion machine 80 is depicted. The loading device 100 includes a frame 102 that is coupled to a front boom 82 of the pipe fusion machine 80. The pipe fusion machine 80 positions the loading device 100 such that a first end effector 112 is located proximate to a ground surface 70 and one end of an elongated object 90, here a pipe. The pipe fusion machine 80 may be a MobileFusion machine available from Fast Fusion, LLC of Palisade, Colo.

Referring now to FIG. 2, the loading device 100 includes a first effector arm 110 that pivots relative to the longitudinal axis 130 of the frame 102 about a first fulcrum surface 106 and a pivot axis 131C. The first effector arm 110 has a longitudinal axis 131 extending from a proximal end 115 to a distal end 114 of the arm, and includes a first end effector 112 that is coupled to the distal end 114 of the first effector arm 110. The first end effector 112 may have one of a variety of shapes, including a conical drum 118, as depicted in FIG. 2. The first end effector 112 defines a first end effector axis 113 and a lifting surface 117. In the embodiment depicted in FIG. 2, the first end effector axis 113 passes through the center of the conical drum 118, while the lifting surface 117 includes the outer surface of the conical drum 118.

The loading device 100 also includes a second effector arm 120 that pivots relative to the longitudinal axis 130 of the frame 102 about a second fulcrum surface 107 and a pivot axis. The second effector arm 120 has a longitudinal axis extending from a proximal end 125 to a distal end 124 of the arm, and includes a second end effector 122 that is coupled to the distal end 124 of the second effector arm 120. The second end effector 122 may have a variety of shapes including a conical drum 118, as depicted in FIG. 2. The second end effector 122 defines a second end effector axis 123 and a lifting surface 127. In the embodiment depicted in FIG. 2, the second end effector axis 123 passes through the center of the conical drum 118, while the lifting surface 127 includes the outer surface of the conical drum 118.

The loading device 100 also includes a plurality of roller elements 103 coupled to the frame 102. Each of the roller elements 103 are configured to rotate about a roller element axis 104. The roller elements 103 allow the elongated object 90 to roll along the loading device 100 and the front boom 82 of the pipe fusion machine 80.

The loading device 100 also includes an actuator 108 coupled to the frame 102 and coupled to both the first effector arm 110 and the second effector arm 120 through a linkage 109. The actuator 108 may be a hydraulic or pneumatic cylinder or a linear stepper motor. The first effector arm 110 and the second effector arm 120 pivot about the respective fulcrum surfaces 106, 107 between a retracted position, as illustrated in FIG. 2, and a deployed position, as illustrated in FIG. 3. The linkage 109 couples the first effector arm 110 and the second effector arm 120 to the actuator 108, such that a single actuator 108 may articulate the first effector arm 110 and the second effector arm 120. Other embodiments of the loading device 100 may include more than one actuator 108 to articulate the first effector arm 110 and the second effector arm 120.

To lift and position an elongated object 90 for introduction to the pipe fusion machine 80, the actuator 108 may move the first effector arm 110 and the second effector arm 120 into the retracted position, as illustrated in FIG. 2. The pipe fusion machine 80 may position the loading device 100 such that an elongate axis 91 of the elongated object 90 is approximately transverse to the roller element axes 104 of the roller elements 103 of the loading device 100. With the loading device 100 aligned relative to the elongated object 90, the actuator 108 may move the first effector arm 110 and the second effector arm 120 towards the deployed position, as illustrated in FIG. 3. The loading device 100 is positioned such that the first end effector 112 and the second end effector 122 contact the elongated object 90 at a vertical position below the elongate axis 91. Because the elongated object 90 illustrated in FIG. 2 is round, by contacting the elongated object 90 below the elongate axis 91, the first end effector 112 and the second end effector 122 contact the elongated object 90 below the thickest portion of the elongated object 90.

As the first effector arm 110 and the second effector arm 120 continue to move towards the deployed position, the lifting surface 117 of the first end effector 112 and the lifting surface 127 of the second end effector 122 contact the elongated object 90 and lift the elongated object 90 at least partially off of the ground surface 70. With the first effector arm 110 and the second effector arm 120 located in the deployed position, the first end effector axis 113 and the second end effector axis 123 may be approximately perpendicular to the elongate axis 91 of the elongated object 90. Further, as depicted in FIG. 3, the first end effector 112 and the second end effector 122 may be positioned at different distances along the respective first effector arm 110 and second effector arm 120, such that the first end effector 112 and the second end effector 122 are positioned to allow the first effector arm 110 and the second effector arm 120 to move to a fully retracted position.

Referring again to FIG. 1, with the elongated object 90 at least partially lifted off of the ground surface 70, the pipe fusion machine 80 may translate towards the elongated object 90, pushing the elongated object 90 first along the first end effector 112 and the second end effector 122, and subsequently along the plurality of roller elements 103 in a direction towards the pipe fusion machine 80. The elongated object 90 may continue to roll towards the pipe fusion machine 80 for completion of a fusion weld process with another elongated object 90.

Loading devices 100 according to the present disclosure are able to lift elongated objects 90 having a variety of diameters. The first end effector 112 and the second end effector 122 may be inserted beneath elongated objects 90 of various diameters to lift the elongated objects 90. With the first effector arm 110 and the second effector arm 120 located in the deployed position, as depicted in FIG. 3, the elongated object 90 will be approximately centered along the frame 82. The contact points between the elongated object 90 and the first end effector 112 and the second end effector 122 will change based on the diameter of the elongated object 90. Further, the loading device 100 may be used to lift elongated objects 90 made from a variety of materials including, but not limited to, polyethylene, aluminum, steel, plastic, copper, and concrete.

Figure 4:
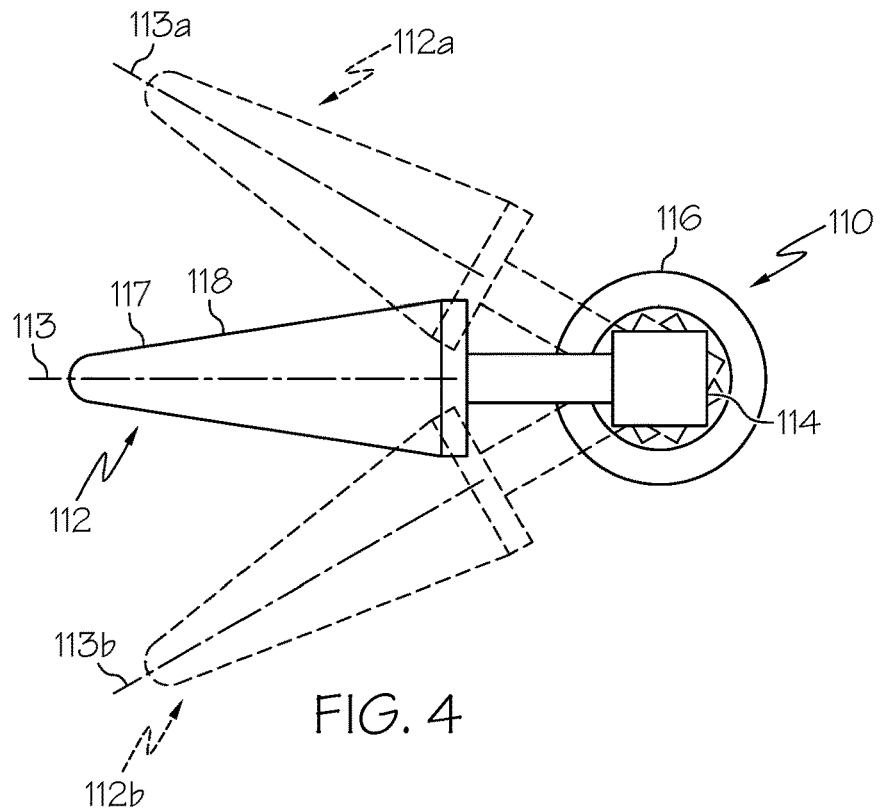
FIG. 4 depicts a front view of an end effector according to one or more embodiments shown and described herein.

Referring again to FIG. 2, in some embodiments of loading device 100, the first effector arm 110 may include a first arm adjuster plate assembly 116 that couples a distal end 114 of the first effector arm 110 to a proximal end 115 of the first effector arm 110. Similarly, the second effector arm 120 may include a second arm adjuster plate assembly 126 that couples a distal end 124 of the second effector arm 120 to a proximal end 125 of the second effector arm 120. As illustrated in FIG. 4, the first arm adjuster plate assembly 116, and similarly the second arm adjuster plate assembly 126, allows the first end effector 112 to be securely positioned between an upward orientation (as illustrated by first end effector 112*a* and corresponding first end effector axis 113*a*) and a downward orientation (as illustrated by the first end effector 112*b* and corresponding first end effector axis 113*b*). The first end effector 112 and the second end effector 122 may be adjusted to accommodate the pitch of the frame 102 relative to the ground surface 70. The first end effector 112 may be adjusted such that a portion of the first end effector 112 is approximately parallel with the ground surface 70. Such a position may discourage the first end effector 112 from digging into the ground surface 70 as the first effector arm 110 moves from a retracted position to a deployed position, while encouraging contact between the lifting surface 117 and the elongated object 90.

Referring again to FIG. 1, in some embodiments of the loading device 100, the first end effector 112 and the second end effector 122 may include powered rotational mechanisms. First end effectors 112 and second end effectors 122 that include powered rotational mechanisms apply forces to the elongated objects 90 in a direction that corresponds to moving the elongated objects 90 away from the ground surface 70 and towards the pipe fusion machine 80. In these embodiments, first end effector 112 and the second end effector 122 translate the elongated objects 90 towards the pipe fusion machine 80 without translating the pipe fusion machine 80 towards the elongated object 90.

Figure 5:
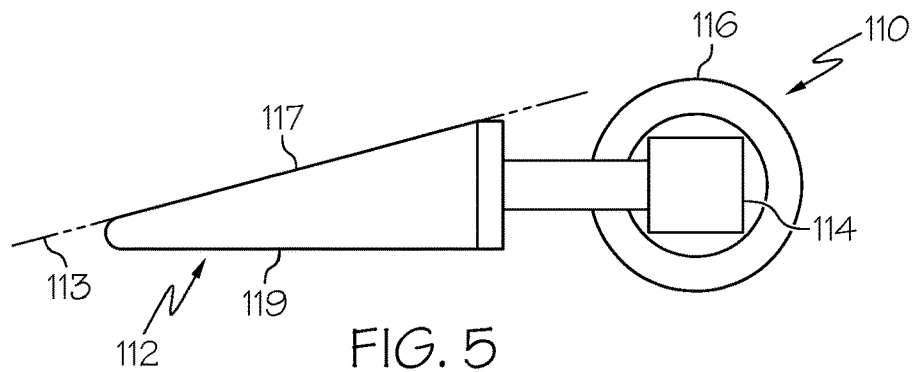
FIG. 5 depicts a front view of an end effector according to one or more embodiments shown and described herein.
Figure 6:
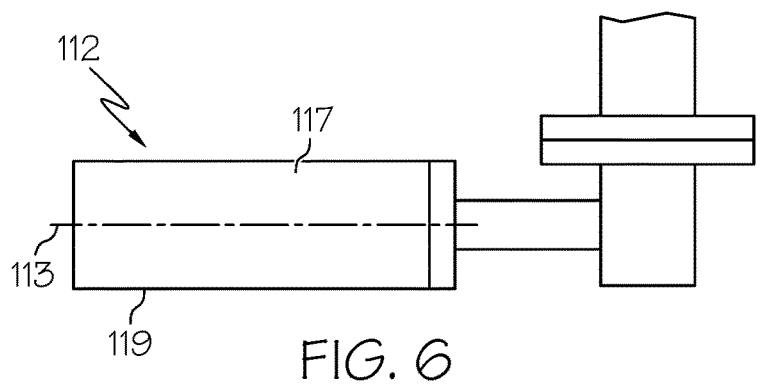
FIG. 6 depicts a top view of an end effector according to one or more embodiments shown and described herein.

Another embodiment of the first end effector 112 is depicted in FIGS. 5 and 6. In this embodiment, the first end effector 112 includes a tapered body 119 that includes a lifting surface 117 that contacts an elongated object 90. The first end effector 112 having a tapered body 119 defines a first end effector axis 113 along the lifting surface 117 at approximately the center of the non-tapered portion of the first end effector 112, as illustrated in FIG. 6. First end effectors 112 and second end effectors 122 having a variety of shapes are contemplated.

Figure 7:
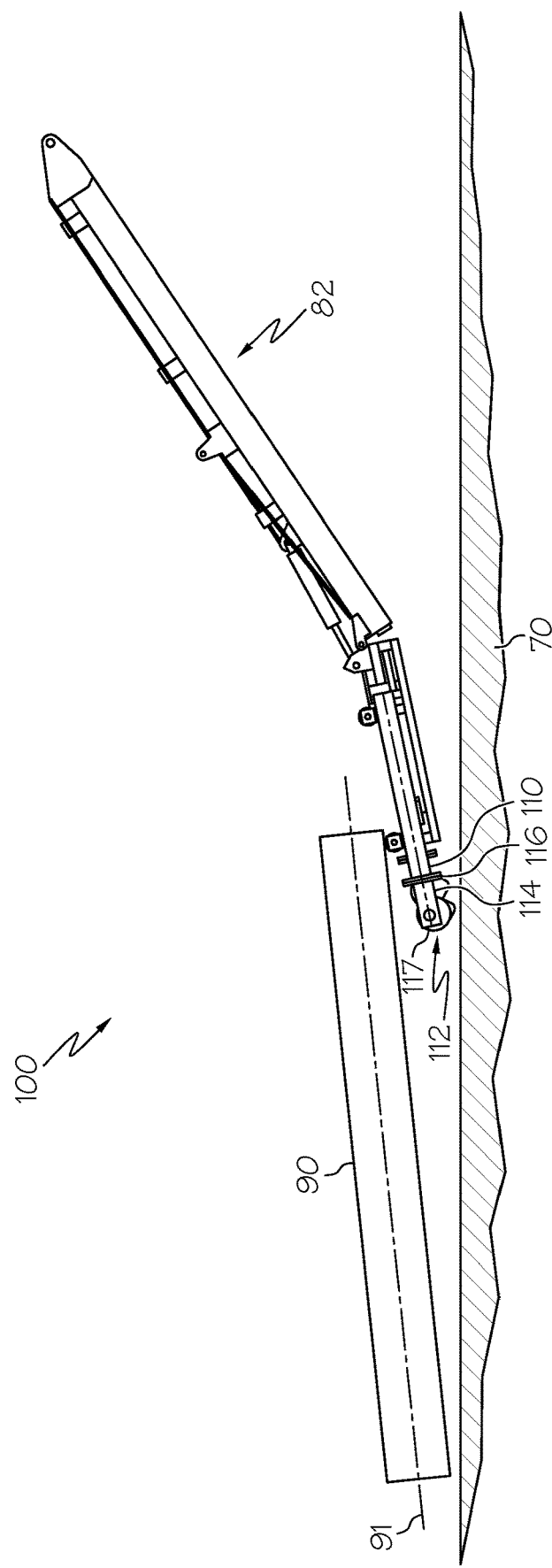
FIG. 7 depicts a side view of a loading device according to one or more embodiments shown and described herein.

Referring now to FIG. 7, some embodiments of the loading device 100 may be adapted to articulate relative to the front boom 82 to which the loading device 100 is coupled. A loading device 100 that articulates relative to the front boom 82 may improve the flexibility of operating the pipe fusion machine (not shown) by increasing the ability of the loading device 100 to at least partially lift the elongated object 90. Such embodiments may include additional actuators that apply force to the loading device 100 to articulate relative to the front boom 82.

Figure 8:
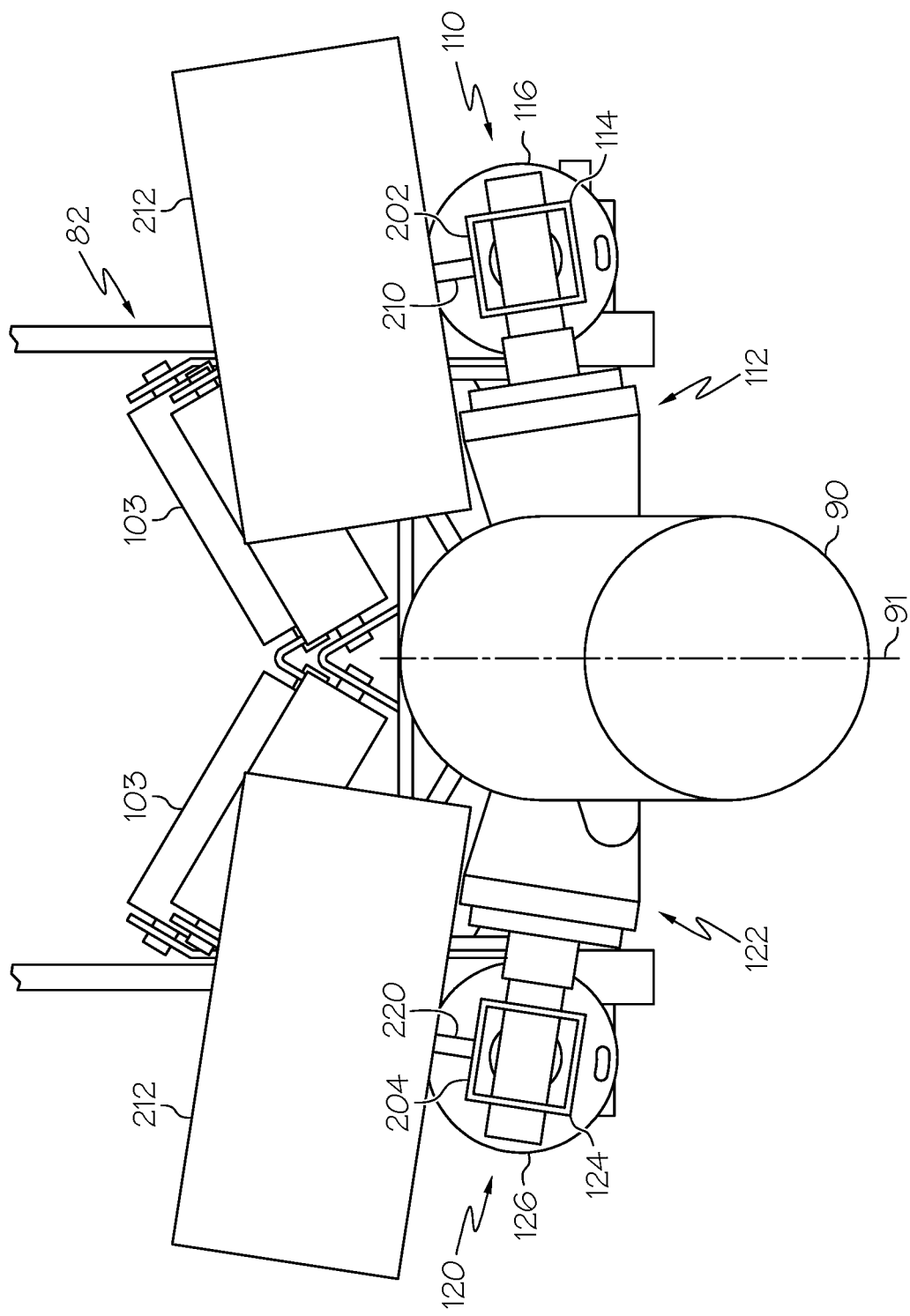
FIG. 8 depicts a front view of a loading device according to one or more embodiments shown and described herein.

Referring now to FIG. 8, embodiments of the loading device 100 may include a first upright arm 210 coupled to a first receiver 202 located at the distal end 114 of the first effector arm 110. The loading device 100 may also include a second upright arm 220 coupled to a second receiver 204 located at the distal end 124 of the second effector arm 120. The first upright arm 210 and the second upright arm 220 may be stanchions that guide the elongated object 90 as the elongated object 90 slides along the roller elements 103 towards the pipe fusion machine (not shown). The first upright arm 210 may include a powered intake wheel 212 that rotates about the first upright arm 210. Similarly, the second upright arm 220 may include a powered intake wheel 212 that rotates about the second upright arm 220. The powered intake wheels 212 may grip the elongated object 90 to apply a force to the elongated object 90 in a direction that pulls the elongated object 90 along the roller elements 103 towards the pipe fusion machine (not shown).

It should now be understood that loading devices according to the present disclosure lift elongated objects from a ground surface and pass those elongated objects towards a pipe fusion machine for a pipe fusion operation. The loading devices include loading arms that pivot between a retracted position and a deployed position. As the loading arms are pivoted to the deployed position, the end effectors contact the elongated object below the thickest portion of the elongated object. As the loading arms continue to pivot to the deployed position, the end effectors at least partially lift the elongated object off of the ground surface, allowing the elongated object to be translated towards the pipe fusion machine.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of loading a pipe having a central elongate axis into a pipe fusion machine, the method comprising:
   a. positioning a loading device coupled to the pipe fusion machine proximate the pipe, the loading device comprising a front boom having a frame with a plurality of roller elements coupled to the frame, each of the roller elements being configured to rotate about a roller element axis, the loading device further comprising a pair of effector arms positioned on opposing sides of the boom frame, each effector arm having a longitudinal axis extending from a proximal end of the effector arm to a distal end of the effector arm, and pivots relative to a longitudinal axis of the boom frame, about a pivot axis at the proximal end of the effector arm, and further comprising a pair of end effectors, wherein one of the end effectors is coupled to the distal end of one of the effector arms, each end effector having an effector axis about which the end effector rotates;
   b. positioning the end effectors along opposing sides of the pipe;
   c. pivoting the effector arms about one or more fulcrum surfaces of the loading device towards the pipe and into a deployed position, wherein in the deployed position the longitudinal axis of each of the effector arms is parallel with the longitudinal axis of the boom frame, the effector axis of each of the end effectors is transverse to the elongate axis of the pipe, and each of the end effectors cross the central elongate axis of the pipe;
   d. contacting the pipe with the end effectors to apply a lifting force to the pipe at a location below the elongate axis; and
   e. causing the pipe to traverse the front boom and the roller elements into the pipe fusion machine.

2. The method of claim 1, further comprising translating the loading device towards the pipe.

3. The method of claim 1, further comprising sliding the pipe along the plurality of roller elements, wherein the roller element axis of each of the roller elements is transverse to the elongate axis of the pipe.

4. The method of claim 1, wherein each of the end effectors has a lifting surface, and wherein the end effectors are coupled with the effector arms such that the effector axis of each of the end effectors is perpendicular to and intersects with the longitudinal axis of the corresponding effector arm, and the end effectors extend laterally relative to the longitudinal axis of the corresponding effector arm such that the longitudinal axis of the effector arm does not intersect with the lifting surface of the end effector.

5. The method of claim 1, wherein the loading device further comprises an actuator moving each of the effector arm and the second effector arm between a retracted position and the deployed position, and wherein the effector arms move in opposing directions as the effector arms are moved by the actuator between the retracted position and the deployed position.

6. The method of claim 1, wherein each of the end effectors comprises a conical drum.

7. The method of claim 1, wherein the each of the end effectors comprises a body tapered longitudinally along the effector axis.

8. The method of claim 1, wherein each of the effector arms comprises an arm adjuster plate assembly allowing the end effector coupled therewith to pivot about the longitudinal axis of the effector arm.

9. The method of claim 1, wherein the loading device further comprises a pair of upright arms, each upright arm coupled to a receiver located at a distal end of each of the effector arms.

10. The method of claim 9, wherein the upright arms each comprises a power intake wheel.

11. A method of loading a pipe having a central elongate axis into a pipe fusion machine, the method comprising:
   a. positioning a loading device coupled to the pipe fusion machine proximate the pipe, the loading device comprising a front boom having a frame with a plurality of roller elements coupled to the frame, each of the roller elements being configured to rotate about a roller element axis, the loading device further comprising a plurality of effector arms, each effector arm having a longitudinal axis and pivots relative to a longitudinal axis of the boom frame;
   b. positioning a first end effector and a second end effector along opposite sides of the pipe, each end effector coupled to one of the effector arms, wherein the end effectors each have an axis about which the end effector rotates;
   c. pivoting each of the effector arms towards the pipe;
   d. contacting and traversing the pipe with and over the first end effector and the second end effector, to apply a lifting force to the pipe at a location below the central elongate axis, wherein when the lifting force is applied to the pipe, the effector arms are located in a deployed position, wherein in the deployed position the longitudinal axis of each of the effector arms is parallel with the longitudinal axis of the boom frame, the axes of the end effectors are transverse to the central elongate axis of the pipe, and the first end effector is positioned before the second end effector, relative to the central elongate axis of the pipe, so that the pipe sequentially traverses the first end effector and the second end effector; and
   e. causing the pipe to traverse the front boom and the roller elements into the pipe fusion machine.

12. The method of claim 11, further comprising translating the loading device towards the pipe.

13. The method of claim 11, further comprising sliding the pipe along the plurality of roller elements of the loading device, wherein the roller element axis of each of the roller elements is transverse to the elongate axis of the pipe.

14. The method of claim 11, wherein the end effectors each further has a lifting surface, wherein the end effectors are each coupled to one of the effector arms such that the end effector axis is perpendicular to and intersects with the longitudinal axis of the effector arm, and wherein the end effectors each extends laterally relative to the longitudinal axis of the effector arm such that the longitudinal axis of the effector arm does not intersect with the lifting surface of the end effector.

15. The method of claim 11, wherein the loading device further comprises an actuator moving the effector arms between a retracted position and the deployed position, and wherein the effector arms move in opposing directions as the effector arms are moved by the actuator between the retracted position and the deployed position.

16. The method of claim 11, wherein each of the end effectors comprises a conical drum.

17. The method of claim 11, wherein each of the end effectors comprises a body tapered longitudinally along the end effector axis.

18. The method of claim 11, wherein the effector arms each comprises an arm adjuster plate assembly allowing the end effectors to pivot about the longitudinal axis of the effector arms.

19. The method of claim 11, wherein the loading device further comprises a pair of upright arms coupled to a receiver located at a distal end of each of the effector arms, and wherein the upright arms each comprises a power intake wheel.

* * * * *